US012394309B2

(12) United States Patent
Nguyen

(10) Patent No.: US 12,394,309 B2
(45) **Date of Patent: *Aug. 19, 2025**

(54) VIRTUAL GATE SYSTEM OF CONNECTED TRAFFIC SIGNALS, DYNAMIC MESSAGE SIGNS AND INDICATOR LIGHTS FOR MANAGING TRAFFIC

(71) Applicant: THRUGREEN, LLC, Manassas, VA (US)

(72) Inventor: David Nguyen, Southbridge, VA (US)

(73) Assignee: Thrugreen, LLC, Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/621,226

(22) Filed: Mar. 29, 2024

(65) Prior Publication Data

US 2024/0242604 A1 Jul. 18, 2024

Related U.S. Application Data

(63) Continuation of application No. 17/138,340, filed on Dec. 30, 2020, now Pat. No. 11,955,005.

(60) Provisional application No. 62/974,826, filed on Dec. 30, 2019.

(51) Int. Cl.
*G08G 1/08* (2006.01)
*G08G 1/01* (2006.01)
*G08G 1/0955* (2006.01)

(52) U.S. Cl.
CPC ............. *G08G 1/08* (2013.01); *G08G 1/0112* (2013.01); *G08G 1/0125* (2013.01); *G08G 1/0145* (2013.01); *G08G 1/0955* (2013.01)

(58) Field of Classification Search
CPC ...... G08G 1/08; G08G 1/0112; G08G 1/0125; G08G 1/0145; G08G 1/0955; G08G 1/081; G08G 1/087; G08G 1/095; G08G 1/09623
See application file for complete search history.

(56) References Cited

U.S. PATENT DOCUMENTS

2013/0022245 A1* 1/2013 Sivertsen ............... G08G 1/096 382/104
2018/0174449 A1* 6/2018 Nguyen ............... G08G 1/0145
2018/0364715 A1* 12/2018 Greenberger ........ G05D 1/0088

* cited by examiner

*Primary Examiner* — Joseph H Feild
*Assistant Examiner* — Sharmin Akhter
(74) *Attorney, Agent, or Firm* — Laubscher & Fretwell, P.C.

(57) ABSTRACT

A system for adaptively controlling traffic control devices having a traffic signal system, a computing network, and a communication system is configured to restrict traffic in one or more directions through a junction and to selectively allow traffic through the restricted directions based, in part, on an identity or action of certain traffic. The traffic signal system is configured to be in communication with the computing network through the communication system. The mobile device is also configured to be in communication with the computing network through the communication system. Then the computing network adaptively controls the traffic signal system using a location of the mobile device.

15 Claims, 7 Drawing Sheets

VIRTUAL GATE SYSTEM OF CONNECTED TRAFFIC SIGNALS, DYNAMIC MESSAGE SIGNS AND INDICATOR LIGHTS FOR MANAGING TRAFFIC

This application is a continuation of U.S. patent application Ser. No. 17/138,340 filed Dec. 30, 2020, which claims the benefit of U.S. Provisional Application No. 62/974,826 filed Dec. 30, 2019. The entire content of each of these applications is incorporated herein by reference. This application also incorporates the contents of U.S. Provisional Application Nos. 62/436,403, 62/600,460, 62/606,170, 62/707,267, 62/660,940, 62/765,280, and 62/922,517, and U.S. non-provisional application Ser. No. 17/67,350 and U.S. Ser. No. 19/28,440 herein in their entirety.

BACKGROUND

Field of the Disclosure

The present disclosure is directed to a virtual gate system using traffic signals, dynamic message signs and indicator lights for managing traffic movement.

Description of the Related Art

SUMMARY

The present disclosure is directed to a system for adaptively controlling traffic control devices having a traffic signal system, a computing network, and a communication system. The system is configured to restrict traffic in one or more directions through a junction and to selectively allow traffic through the restricted directions based, in part, on an identity or action of certain traffic. The traffic signal system is configured to be in communication with the computing network through the communication system. The mobile device is also configured to be in communication with the computing network through the communication system. Then the computing network adaptively controls the traffic signal system using a location of the mobile device.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Figure 1:
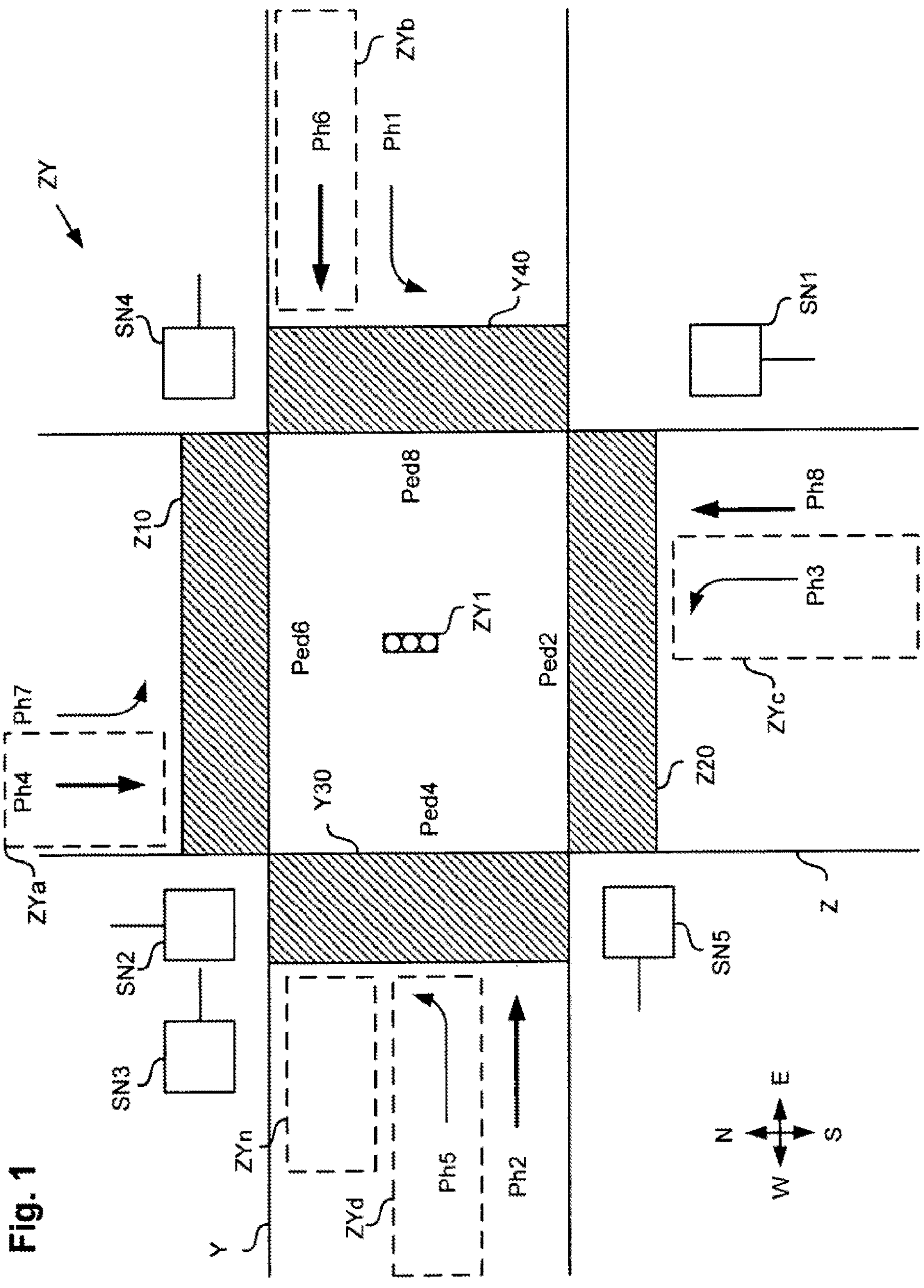
FIG. 1 is a plan view of a junction ZY, formed by an intersection of a road segment Z and a road segment Y, according to one example.

In the drawings, like reference numerals designate identical or corresponding parts throughout the several views. Further, as used herein, the words "a", "an" and the like generally carry the meaning of "one or more", unless stated otherwise. Referring now to the drawings, wherein like reference numerals designate identical or corresponding parts throughout the several views.

A system for selectively controlling access to a road segment for one or more modes of transportation under certain conditions. The use herein of the terms 'vehicle', 'driver', and 'user' may be used interchangeably with certain exceptions where indicated. Examples and cases herein describing traffic signals changing may mean a traffic signal controller (TSC) that operates the traffic signals changing traffic signals from a first state to a second state, such as from red to green, green to yellow, yellow to red, from "Walk" to "Don't Walk", "Walk" to a pedestrian countdown, or "Don't Walk" to "Walk".

FIG. 1 is a plan view of a junction ZY, formed by an intersection of a road segment Z and a road segment Y, according to one example. The junction ZY may be a four way intersection having a crosswalk in one or more directions, such as the crosswalks Z10, Z20, Y30 and Y40. The junction ZY may also have a set of traffic signals ZY1 to control traffic movements in each direction through the junction ZY. The junction ZY may have traffic phases Ph1-Ph8 where phases Ph1, Ph3, Ph5, and Ph7 are left turn phases, and phases Ph2, Ph4, Ph6, and Ph8 are through phases. Through phases Ph2, Ph4, Ph6, and Ph8 may also permit right turns. Pedestrian crosswalk phases Ped2, Ped4, Ped6, and Ped8 may also be present for crosswalks Z20, Y30, Z10, and Y40, respectively.

The junction ZY may have one or more geofences, such as the virtual approaches ZYa, ZYb, ZYc, and ZYd corresponding to phases Ph4, Ph6, Ph3, and Ph5, respectively, for the pw-pose of detecting a user or vehicle location with respect to the junction ZY, and making decisions based on that information.

There may be one or more signs located at, near or en route to the junction ZY such as the signs SN1-SN5. Signs may be located at or en route but some distance from the junction ZY, such as within about one mile of the junction ZY on the road segment Z or Y. Signs may be static or of the Dynamic Message Sign (DMS) type. The traffic signals ZY1, sensors, and other equipment may be configured to communicate with a traffic management system (TMS) I 01.

Figure 2:
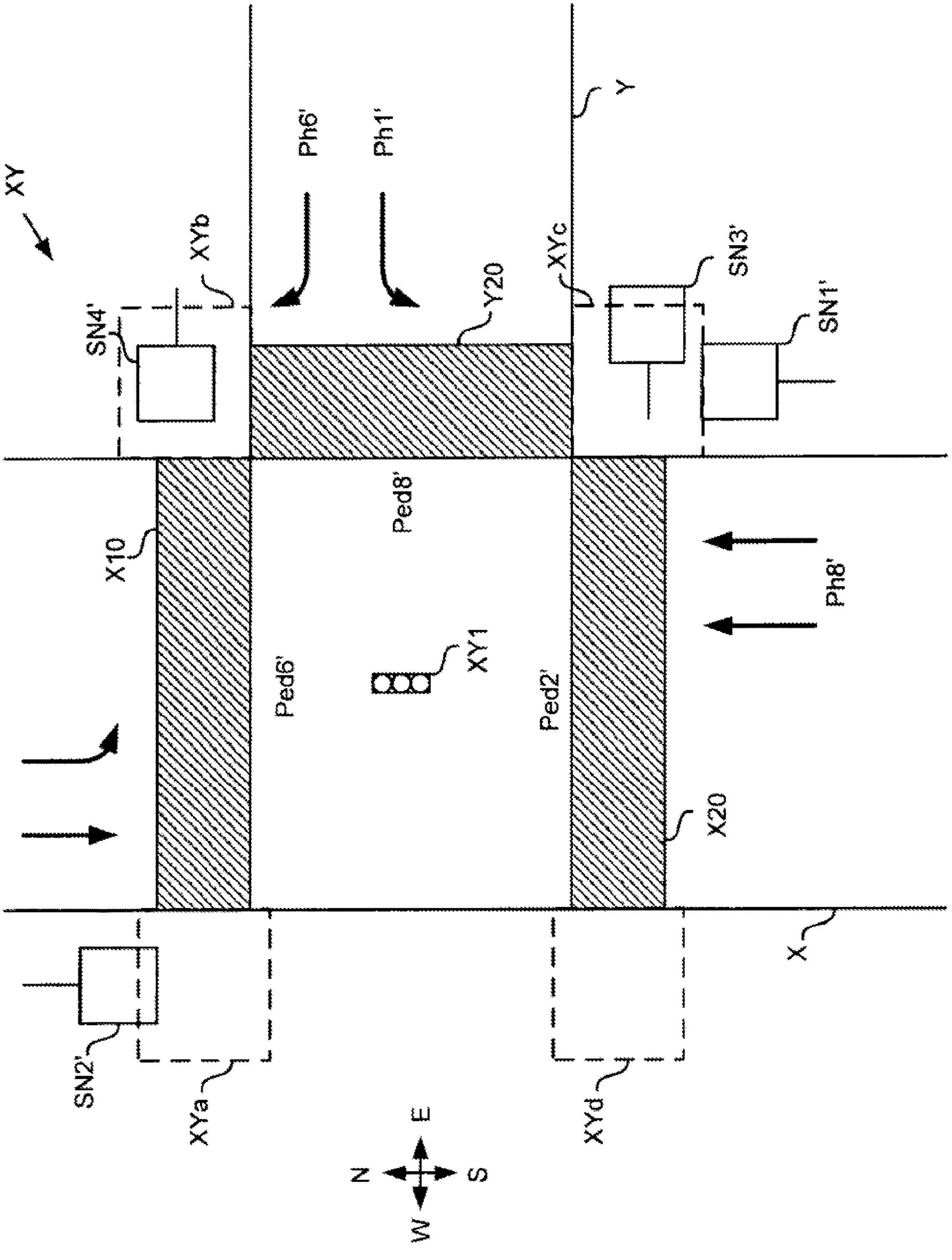
FIG. 2 is a plan view of a junction XY, formed by an intersection of a road segment X and a road segment Y, according to one example.

FIG. 2 is a plan view of a junction XY, formed by an intersection of a road segment X and a road segment Y, according to one example. The junction XY may be a three way intersection that has a crosswalk in one or more directions, such as the crosswalks X10, X20, and Y20. The junction XY may also have a set of traffic signals XY1 to control traffic movements in each direction through the junction XY. The junction XY may have traffic phases, such as phases Ph1', Ph4', Ph6', Ph7', and Ph8'. Pedestrian crosswalk phases Ped2', Ped6', and Ped8' may also be present for crosswalks X20, X10, and Y20, respectively.

The junction XY may have one or more geofences, such as the virtual approaches XYa, XYb, XYc, and XYd, for the purpose of detecting a user location with respect to the junction XY and its crosswalk approaches, and making decisions based on that information. The virtual approach XYa may correspond to pedestrian phase Ped6', the virtual approach XYb may correspond to pedestrian phases Ped6' and Ped8', the virtual approach XYc may correspond to pedestrian phases Ped8' and Ped2', and the virtual approach XYd may correspond to pedestrian phase Ped2'. These virtual approaches may serve as locations that, once a vehicle, device or user is detected to have entered, location information about the vehicle, device or user may be provided to the TMS I 0I and/or the respective traffic signal controller (TSC) for the traffic signals XY1. Further, each virtual approach may have a pre-approach to ascertain direction or heading of the vehicle, device or user.

There may be one or more signs located at, near or en route to the junction XY such as the signs SN1'-SN4'. Signs may be located at or en route but some distance from the junction XY, such as within about one mile of the junction XY on the road segment X or Y, and may be static or of the Dynamic Message Sign (DMS) type. As in FIG. 1, the traffic signals XY1, sensors, and other equipment may be configured to communicate with the traffic management system (TMS) 101.

Figure 3:
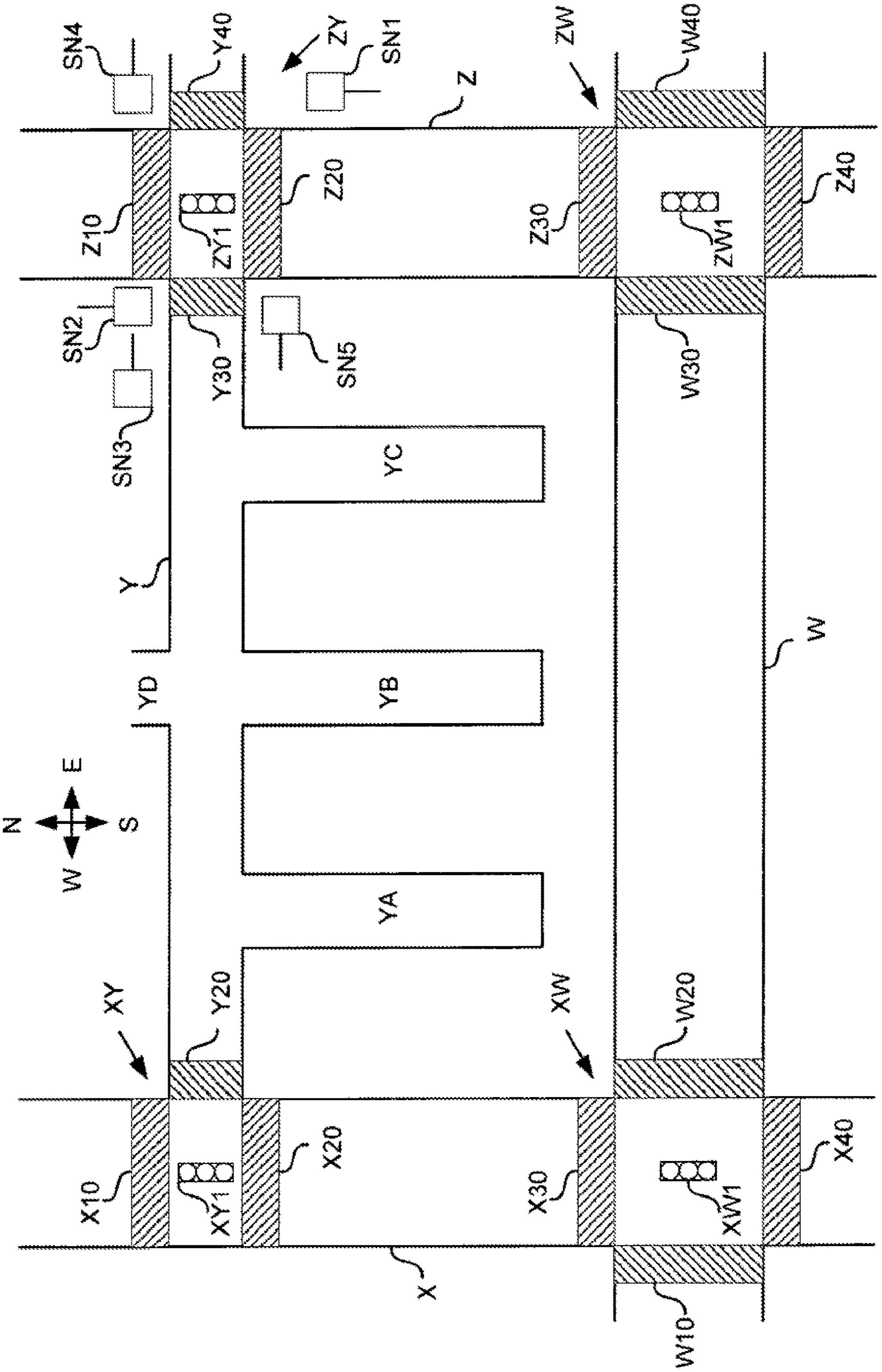
FIG. 3 is a diagram of an area having road segments W, X, Y, and Z, with a compass representing North (N), East (E), West (W), and South (S) directions, according to one example.

FIG. 3 is a diagram of an area having road segments W, X, Y, and Z, with a compass representing North (N), East (E), West (W), and South (S) directions, according to one example. The road segment X intersects the road segments Y and W at junctions XY and XW, respectively. The road segment Z intersects the road segments Y and W at junctions ZY and ZW, respectively. Each junction may have one or more approaches, for example, as shown in FIGS. 1 and 2. Each junction may have a status and each approach of each junction may have a status. The status may be broadly categorized as open or restricted, and subsets of status within each broad category may be further defined, such as that of traffic signals. Restrictions may vary by time, by the vehicle, and or by the user. The use of the terms 'vehicle', 'driver', and 'user' may be used interchangeably with certain exceptions where indicated. The ways in which junctions and/or approaches may be restricted are described further herein. An approach or a junction may have physical barrier element as well. However, restrictions may be of a virtual type including use of traffic signals, signs, and control devices to indicate to vehicles and users that access is limited or restricted.

The road segment Y may have dead end road segments YA, YB and YC that each intersect only with the road segment Y. The road segment Y may have an intersection YD with another through road that may not be a dead end, and which may lead through to other roads, such as to road segments X and/or Z.

The junction ZY may be a four way intersection, as described by FIG. 1, that has a crosswalk in one or more directions, such as crosswalks Z10, Z20, Y30 and Y40. The junction ZY may also have a set of traffic signals ZY1 to control traffic movements in each direction through the junction ZY.

The junction XY may be a three way intersection, as described by FIG. 2, that has a crosswalk in one or more directions, such as crosswalks X10, X20, and Y20. The junction XY may also have a set of traffic signals XY1 to control traffic movements in each direction through the junction XY.

The junction XW may be a four way intersection that has a crosswalk in one or more directions, such as crosswalks W10, W20, X30 and X40. The junction XW may also have a set of traffic signals XW1 to control traffic movements in each direction through the junction XW. The junction ZW may be a four way intersection that has a crosswalk in one or more directions, such as crosswalks W30, W40, Z30 and Z40. The junction ZW may also have a set of traffic signals ZW1 to control traffic movements in each direction through the junction ZW.

The sets of traffic signals XY1, ZY1, XW1, and ZW1 may have independent control over each phase of travel of the junctions XY, ZY, XW, and ZW, respectively, including phases for vehicles, bicycles and/or pedestrians.

The road segments X and Z may not intersect, the road segments Y and W may not intersect, and the road segment W may serve as a path for vehicular traffic to navigate between the road segments X and Z. It may also be possible for vehicular traffic to navigate between the road segments X and Z using the road segment Y.

However, for a variety of reasons, this may not be desirable to residents or organizations located on or in nearby areas of the road segment Y. Techniques described herein may be implemented to selectively control, limit or restrict through traffic from using the road segment Y to navigate between the road segments X and Z, without restricting certain other traffic from accessing the road segment Y, such as those for residents who live on the road segments Y, YA, YB, or YC, or in the same neighborhood, their guests and visitors, service vehicles, delivery vehicles, and emergency and official government vehicles.

Access to part or all of the road segment Y by certain types of traffic, such as vehicular (or certain types of vehicular), scooter, bicycle, or pedestrian traffic, may be restricted. For example, the portion of road segment Y between the junctions XY and ZY may be restricted, while the portion of road segment Y east of the junction ZY may be unrestricted.

Traffic restrictions may vary by day of week (DOW) and/or time day (TOD), type of vehicle, traffic counts per period of time, and/or by system users. Users may include vehicles (such as autonomous or operated by a human driver), drivers, passengers and others who may not be aboard a vehicle, such as a person residing near a restricted junction or road segment, but may be connected to the TMS 101 or junction equipment in some way, such as via an app or mobile device.

Traffic restrictions may include placement and operation of various traffic control devices. Traffic control devices may include traffic signals, static signs and/or DMS, and/or physical barriers.

Signs may include verbiage or symbolic indicators such as to allow or disallow through traffic or certain types of through traffic, certain turns, certain turns on red, or no entry (e.g. "No Thru Traffic", "Authorized Traffic Only", "No Left Turn", "No Right Turn", "No Turn On Red", "Do Not Enter", etc.).

Signs, whether static or dynamic, may be located at or near a junction in any direction to indicate to vehicles, drivers and others a status of the junction or road segment, or for the provision and dissemination of information.

In one case, a sign SN1 may be located south of the junction ZY facing the northbound direction of travel of the road segment Z to indicate a restriction on certain actions with respect to road segment Y, such as "No Left Turn". In another case, a sign SN2 may be located north of the junction ZY facing the southbound direction of travel of the road segment Z to indicate a restriction on certain actions with respect to road segment Y, such as "No Right Turn" or "No Turn on Red".

In another case, a sign SN3 may be located west of the junction ZY facing the westbound direction of travel of the road segment Y to indicate a restriction on certain actions with respect to road segment Y such as "Do Not Enter" or "No Through Traffic".

In another case, a sign SN4 may be located east of the junction ZY facing the westbound direction of travel of the road segment Y to indicate a restriction on certain actions with respect to a status of the road segment Y located on the western portion of the junction ZY, such as "Do Not Enter" or "Right Lane Must Turn Right".

In another case, a sign SN5 may be located west of the junction ZY facing the eastbound direction of travel of the road segment Y to indicate a restriction on certain actions with respect to road segment Y such as "No Turn on Red".

In another case, any of the signs SN1-SN5 may be a DMS and may also have a count up or countdown timer display, such as time until a traffic signal is anticipated or scheduled to turn red, yellow or green, or walk, don't walk or begin a pedestrian countdown, or to provide a bicycle traffic signal. A DMS may be off by default and then display a message on a schedule, such as to indicate a restriction is active or not active, or to display a message in a case a vehicle is detected to be approaching the DMS. Messages displayed by the DMS may be directed at all passersby or toward a specific vehicle or user, to a specific group or class of vehicles, or to certain passersby, such as residents of all or a portion of the road segment Y. A sign may also display information for interacting with a traffic signal, as further described below. Each of the signs SNI-SN5 may display certain restrictions, qualifiers, or exceptions.

A traffic control device may be deployed in conjunction with a monitoring device such as a still or video camera, or other sensor such as an infrared, thermal, ultrasonic, optical, acoustic, or laser sensor for detection of motorized and non-motorized vehicle and/or pedestrian traffic. The monitoring device may be equipped to identify vehicles or users, such as via using Automatic License Plate Recognition (ALPR) or facial recognition camera capability, to identify vehicles or users entering or leaving a restricted road segment. The monitoring device may be connected to the TMS 101 and/or a local traffic signal controller or circuitry via a wired or wireless communication. In other words, a TSC or the traffic signals XY1 may receive detection requests from the TMS 101 or from a nearby vehicle, device or user directly.

Traffic restrictions, qualifiers or exceptions may include additional conditions, such as by vehicle type, vehicle ID, residential status, and/or DOW/TOD rather than at all times. Signs may be located some distance, such as within one mile of an aforementioned junction XY or ZY to provide advance notice about restrictions to vehicles, drivers, and/or users approaching the junction XY or ZY.

Information on signs may also be conveyed to display virtually on mobile devices, visually in a non-visual format, such as by audio message or as haptic signals, or provided in various data formats to a remote database, such as in a cloud or server environment, and/or to broadcast to a device that may be located in the vicinity of the sign, such as to a mobile phone or via a roadside unit (RSU) configured to send and/or receive data to an On-Board Unit (OBU) on a vehicle or person, for example, using Dedicated Short Range Communication (DSRC), Wi-Fi, or cellular (e.g. 4G, 5G, LTE) technology.

A traffic restriction may be set by the TMS I 01 using one or more traffic signals, such as the junction XY and/or the junction ZY. A red light signal in a restricted direction of the junction ZY may remain red for a time duration RT, for example, from that of a minimum green signal time duration of a phase of the junction ZY, up to about 24 hours in duration.

For example, if vehicular traffic is restricted from entering the road segment Y west of the junction ZY during the time duration RT, then phase Ph3 (shown in FIG. 1) may not turn green, phase Ph4 may disallow right turns (e.g. by indicating such via the sign SN2 and/or not providing a right turn arrow signal in that phase, if such arrow is available), and phase Ph6 may require traffic to turn right to go northbound on road segment Z (e.g. by indicating such via the sign SN4) while the traffic restriction is in effect. Phases Ph2 and Ph5 may also remain Resting on Red (RoR), and phase Ph2 may disallow right turns (e.g. by indicating via the sign SNS). Provided there are no conflicts the pedestrian phase Ped4 may rest on walk, or may be fully actuated or immediately responsive to a corresponding pushbutton or user request (such as via an app), while the other pedestrian phases Ped2, Ped6 and Ped8 may operate in a different mode that may not be fully actuated or immediately responsive to inputs.

Further, if the signs SN1-SN5 are dynamic, the signs SN1-SN5 may display corresponding indicators during the time duration RT such as the sign SN1 indicating no left turn, the sign SN2 indicating no right turn, no turn on red and/or no through traffic, the sign SN3 indicating do not enter, the sign SN4 indicating all traffic must turn left or right, and/or the sign SN5 indicating no turn on red.

The junction ZY may thus effectively function as a three-way intersection, as if the portion of road segment Y located west of the junction ZY did not exist except for approved or authorized users. Other vehicular traffic may still physically enter but would be violating law, may be monitored and therefore may be subject to enforcement actions. Further, if there is another junction of the road segment Y, such as the junction XY, that provides a route for through traffic on the road segment Y between the junction ZY and the junction XY, and both the junction ZY and the junction XY are operating in a traffic restricting mode then, unauthorized traffic that enters the road segment Y may not leave without breaking the law, unless the unauthorized traffic then receives permission to do so.

Further, one or more physical barriers PB may be used to deter one or more types of traffic (vehicular or otherwise) during the traffic restricting time duration RT. A physical barrier PB may include motorized devices such as gates, bollards, tire spikes, or mobile barriers that may be retracted or otherwise positioned to allow traffic through a particular border such as that which may be located on the road segment Y west of the junction ZY and parallel to the pedestrian crosswalk Y30.

However, during periods of restriction the physical barrier PB may be actuated to prevent one or more types of traffic from crossing the particular border or entering a road segment, such as the road segment Y located west of the junction ZY. Barriers may prevent motor vehicles such as automobiles, buses and trucks from passing through but may allow pedestrian, bicycle and certain other motorized traffic to do so. In one case during the time duration RT that a restriction may be in effect for the road segment Y at the junction ZY, the traffic signals ZY1 may rest on green (RoG) in one or more non-conflicting unrestricted phases, such as a first phase set in a northbound (e.g. Ph8) and/or southbound directions (e.g. Ph4) of the road segment Z. The traffic signals ZY1 may remain RoG in the first phase set unless a conflicting signal in a second phase set in an unrestricted direction, such as for pedestrian crosswalk Z10 or Z20 is actuated, or traffic is detected, such as in phases Ph 1, Ph6, or Ph7. Once at least a minimum green time on the first phase set has elapsed (e.g. northbound and/or southbound direction) then the traffic signals ZY1 may change to the second unrestricted phase.

Further, if the crosswalk Z10 or Z20 does not have a pushbutton or way for a user to actively actuate it, such as via a detection from a sensor, app, or other input process, then the traffic signals ZY1 may alternate between the first and the second unrestricted phase sets, such as green for phases Ph4 and Ph8, and for pedestrian phases Ped2 and/or Ped6. The phases Ph1 and Ph6, or the phases Ph6 and Ph7 (e.g. right turn only) at the junction ZY may also alternate with the RoG of phases Ph4 and Ph8 during the restriction described, whether by a timed schedule or by actuation as traffic is detected in those phases.

In another case, the traffic signals ZY1 may rest on red (RoR) all around (phases Ph1-Ph8) unless vehicular traffic is detected. Then any active pedestrian phase(s) may count-down until all conflicting crosswalks are in a Don't Walk phase to allow the traffic signals ZY1 to change from pedestrian phases Ped2 and/or Ped6 to vehicle phases Ph4 and/or Ph8, or one or more other unrestricted phases, for an amount of time before reverting back to RoR.

In another case, the traffic signals ZY1 may have a time schedule, switching between unrestricted phases for vehicle traffic and walk signals for pedestrian phase(s). The time schedule may also be adaptable to be responsive to detection events of one or more of the vehicular traffic and the pedestrian traffic. For example, a pedestrian or vehicle detection may result in shortening of a time duration of a present green phase such that the traffic signals ZY1 may adapt to provide a green phase in another direction of travel having detected traffic.

In another case, the traffic signals ZY1 may rest on green (RoG) in an unrestricted northbound and/or southbound direction of the road segment Z until a maximum green time is reached in one of those directions, or traffic is detected, such as by a pushbutton at the junction ZY or other cross-walk actuation request (a 'call') is received from the TMS 101 requesting a pedestrian phase Ped2 or Ped6, that conflicts with phases Ph4 or Ph8, or a conflicting phase that is not restricted, such as phase Ph1 or Ph6 (e.g. right turn only), or Ph7 receives a call. However, the TSC and traffic signals ZY1 may not be responsive to changing phases Ph2, Ph3, PhS from red during a restricted time period if the road segment Y west of the junction ZY is restricted.

In another case, the traffic signals ZY1 may hold phases in a direction of travel on the mainline (e.g. Ph8 or Ph4 for road segment Z) green until the expected value (EV) of vehicular traffic in one or more of those phases decreases to below a threshold value, such as that of the side street (e.g. Ph1, Ph2, Ph5, or Ph6) or a function thereof, to prevent stopping vehicular traffic before changing to a pedestrian phase (e.g. Ped2' or Ped6'). Further, the traffic signals ZY1 may do the same for pedestrian EV. Inputs for EV may come from the TMS 101, or one or more data sources such as sensors or detectors located at or near the junction ZY or an adjacent junction.

In each case above the phases Ph3, Ph4, Ph6 may disallow traffic from entering the road segment Y, and the phases Pb2 and Ph5 may disallow traffic from exiting the road segment Y while the exemplary restriction to road segment Y is in effect.

In another example, if traffic is restricted from entering the road segment Y from the junction XY during a time duration RT, then phase Ph7' (shown in FIG. 2) may not turn green, and phase Pb8' may disallow right turns. Phases Ph1', Ph6' may also remain Resting on Red (RoR), and phase Ph6' may disallow right turns. Provided there are no conflicts the pedestrian phase Ped8' may rest on walk, or may be fully actuated or immediately responsive to a corresponding push-button or user request (such as via an app), while the pedestrian phases Ped2' and Ped6' may operate in a different mode that may not be fully actuated or immediately responsive to inputs.

Further, if the signs SN1'-SN4' are dynamic, the signs SN1'-SN4' may display corresponding indicators during the time duration RT such as the sign SN1' indicating "No Right Turn", "No Turn On Red" and/or "No Through Traffic", such as the sign SN2' indicating "No Left Turn", such as the sign SN3' indicating "Do Not Enter", "No Through Traffic" and/or such as the sign SN4' indicating "No Turn On Red".

The junction XY may thus effectively function as a straight section of road without an intersection, possibly as a section of road with one or more mid-block crosswalks X 10 and/or X20, as if the portion of road segment Y located east of the junction XY that intersects with the road segment X does not exist. Unauthorized traffic may physically enter the road segment Y if there is no physical barrier but may be violating law, may be monitored and therefore may be subject to enforcement actions. Further, if there is another junction of the road segment Y, such as the junction ZY, that provides a route for through traffic on the road segment Y between the junction XY and the junction ZY, and both the junction ZY and the junction XY are operating in a traffic restricting mode, then unauthorized traffic that enters may not leave without breaking the law, unless the unauthorized traffic receives permission to do so.

Additionally, as with the above example for the junction ZY, one or more physical barriers PB may be used to deter traffic during the traffic restricting time duration RT. A physical barrier PB may be used to restrict or allow traffic at a particular border such as that located on the road segment Y east of the junction XY and approximately parallel to the pedestrian crosswalk Y20. However, during periods of restriction the physical barrier PB may be actuated to prevent traffic from crossing the particular border or entering a road segment, such as the road segment Y located between the junctions XY and ZY.

In cases traffic is restricted from entering and/or exiting the road segment Y between the junction XY and the junction ZY, through traffic between the road segment X and the road segment Y in each direction may be routed along the road segment W between the junction XW and the junction ZW. Traffic flow along the road segments X and Z may be improved during the time duration RT of the traffic restriction for the road segment Y between the junctions XY and ZY. This may be due to the virtual reduction or elimination of the junction XY, except possibly for the pedestrian phases Ped2' and Ped6', and the virtual reduction or elimination of several traffic phases at the junction ZY, such as traffic phases Ph2, Ph3 and Ph5, and changes or turn restrictions in the directions of phases Ph4 and Ph6.

In one case during the time duration RT that a restriction may be in effect for the road segment Y at the junction XY, the traffic signals XY1 may rest on green (RoG) in one or more non-conflicting unrestricted first phases, such as the northbound and/or southbound directions of the road segment X, unless conflicting pedestrian crosswalk phase, such as Ped2' at the crosswalk X20 or Ped 6' at the crosswalk X10, respectively, in a second unrestricted phase is actuated. If there is a crosswalk and no pushbutton or way to actuate a crosswalk signal, such as via a detection from a sensor, app, or other input process, then the traffic signals XY1 may alternate between the unrestricted first and second phases, such as green for vehicle phases Ph4' and/or Ph8', and walk for pedestrian phases Ped2' and/or Ped6'. The phases Ph1' and Ph6', or the phases Ph6' and Ph7' at the junction XY may also alternate with the RoG of phases Ph4' and Ph8' at a reduced frequency and/or time duration, or may be omitted. altogether, during the restricted time duration RT described.

In another case, the traffic signals XY1 may rest on red (RoR) all around unless vehicular traffic is detected, and pedestrian phase(s) may countdown to change the traffic signals XY1 from pedestrian phases Ped2' and/or Ped6' to vehicle phases, such as phases 4' and/or 8', for an amount of time before reverting to RoR and pedestrian phases Ped2' and/or Ped6'. This is effectively a case of resting on walk for the pedestrian phases unless vehicular traffic is detected in certain phases.

In another case, the traffic signals XY1 may have a timing schedule, switching between green signals for vehicle traffic and walk signals for pedestrian phase(s). The timing schedule may be adaptable to be responsive to detection events of one or more of the vehicular traffic and the pedestrian traffic.

In another case, the traffic signals XY1 may remain green (RoG) in the northbound and/or southbound directions of the road segment X until a maximum green time is reached in one of those directions or pedestrian traffic is detected via a pushbutton at the junction XY or other crosswalk actuation is received from the TMS 101, before the traffic signals XY1 change to one or more pedestrian phase(s) such as pedestrian phases Ped2' and/or Ped6'.

In another case, the traffic signals XY1 may hold phases in a direction of travel on the mainline (e.g. Ph8' or Ph4' for road segment X) green until the expected value (EV) of vehicular traffic in one or more of those phases decreases to below a threshold value, such as that of the side street (e.g. Ph1' or Ph6') or a function thereof, to prevent stopping vehicular traffic on the mainline before changing to a pedestrian phase (e.g. Ped2' or Ped6'). Further, the traffic signals XY1 may do the same for pedestrian EV. Inputs for EV may come from the TMS 101, or one or more data sources such as sensors or detectors located at or near the junction XY or an adjacent junction.

In each case above the phases Ph7' and Ph8' may disallow traffic from entering the road segment Y and the phases Phi' and Ph6' may disallow traffic from exiting the road segment Y while the exemplary restriction to road segment Y is in effect. Phase Ph8' may use the sign SN1' to notify drivers of right turn restrictions. Phase Ph7' may use the sign SN2' to notify drivers of left turn restrictions. Further, the sign SN3' may be used to indicate to drivers a "Do Not Enter" message while the sign SN4' may indicate to drivers a "No Turn On Red" message and/or other restrictions to drivers in phase Ph6' heading away from the road segment Y onto the road segment X. Each of the signs SN1'-SN4' may be static or dynamic message signs (DMS).

For any case, if the restricted time duration RT is greater than a maximum cycle time for one or more phases of the junctions XY and/or ZY, then the unrestricted phases of the traffic signals XY1. and ZY1, may cycle green and/or walk between unrestricted phases of their respective junctions, while limiting operation of the restricted phases from changing to green and/or walk. Alternatively, the balance of the restricted time duration RT may be used as a present max cycle time for any unrestricted phase.

For all cases, an emergency traffic signal preemption request may override restrictions described to allow for expedited green signals in the direction of travel of an emergency vehicle.

During a period of restriction at the junction ZY, such as the time duration RT, a first timing plan may be in effect for the traffic signals ZY1 of the junction ZY. Once the time duration RT has elapsed, the traffic signals ZY1 may change or revert to a second timing plan that may include actuation of the restricted phases or directions of the junction ZY.

Further, if the time duration RT has not elapsed, the junction ZY is operating in a restricted mode such as with the first timing plan, and an authorized user receives permission to proceed through a restricted phase or direction of the junction ZY, then the restriction may be temporarily changed to allow the authorized vehicle or user (or a user's assignee such as a guest or visitor) to proceed through the restricted location, before reverting back to the restricted mode, such as by the traffic signals ZY1 returning to operating on the first timing plan and not continuing to service the restricted phases.

Figure 4:
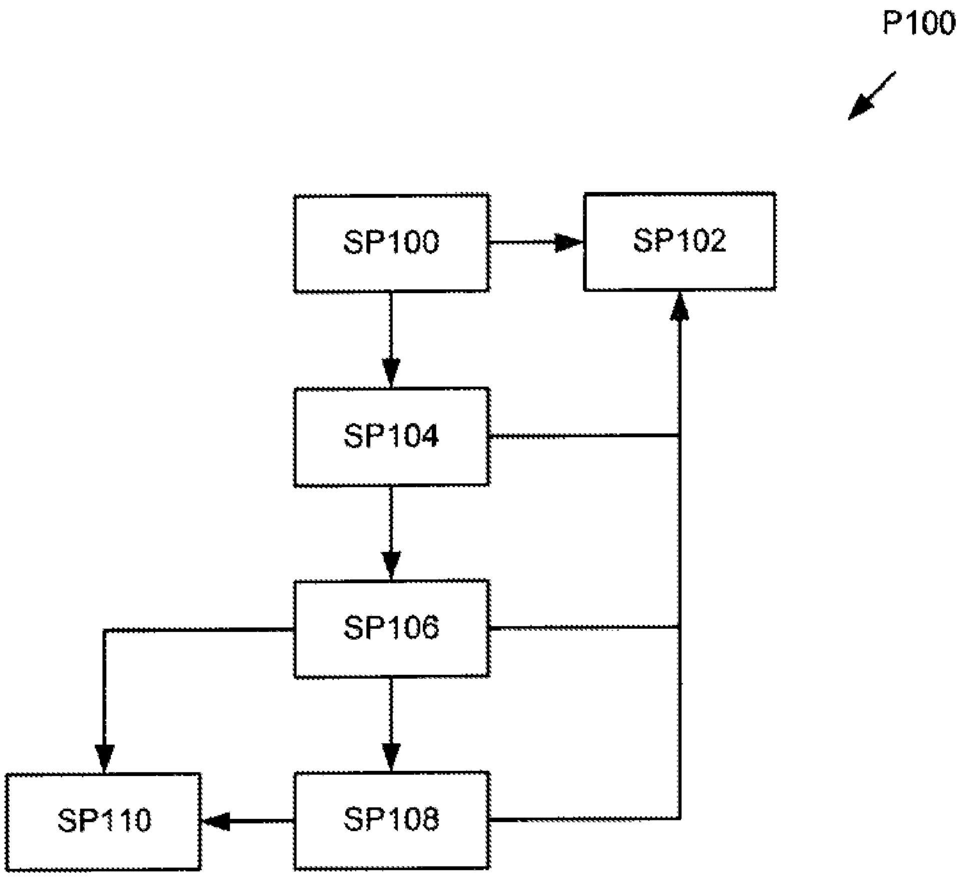
FIG. 4 is a diagram of an access process P100 for a junction or gate during a period of restriction, according to one example.

FIG. 4 is a diagram of an access process P100 for a junction or gate during a period of restriction, according to one example. The process P100 may be used by the TMS 101 during a restricted time duration RT at a restricted location, such as those described above for the exemplary junctions XY and ZY, to determine if certain traffic may bypass a restriction. The process P100 may include one or more sequences of some or all of sub-processes SP100, SP102, SP104, SP106, SP108, and SP100 described below.

The process P100 may begin by proceeding to the sub-process SP100 to determine if presence of traffic is detected, traffic including possible users. If traffic is not detected then the process P100 may proceed to the sub-process SP102 resulting in no further action, the signal phase and timing of the junction operating unchanged, or a position of a gate or physical barrier remaining unchanged. Since no action may be needed, the sub-process SP102 may not be necessary but is included for illustrative purposes. If traffic is detected, as described below, the process P100 may proceed to the sub-process SP104.

Traffic may be detected in any number of ways previously described such as by monitoring devices, sensors or via data input received by the TMS 101 or the local intersection hardware. These may include a user being identified by an ALPR-capable camera, an RFID tag, a mobile device located inside a geofence and transmitting its location to the TMS 101 or the local intersection hardware (references to the TMS 101 are generally intended to also include the local intersection hardware), facial recognition of a person at a particular location, and/or otherwise identifying a type or class of vehicle.

Data input received by the TMS 101 or the local intersection hardware may come from an authorized third-party, and may not require the identity of traffic or authentication of a user identity by the TMS 101. For example, the identity of the traffic or authentication of the user identity may be completed by a separate process performed by the authorized third-party.

Traffic may not always be detected automatically. In one case, a restriction may be in place for the junction XY and yet the TMS 101 may not detect traffic in the westbound direction of the road segment Y, for example due to the junction XY not having sensors or detection at that location. Instead of traffic or a user being detected automatically, the user may initiate an action to identify themselves to the TMS I 01 and request to bypass the restriction. These may include actions to communicate with the TMS 101 or local TSC at the junction such as by pressing a button on a fob, sending a text message, dialing a phone number, using an app on a mobile device, or communicating with the TMS 101 in some way. Each of these actions may provide a way to inform the TMS 101 of the presence of traffic associated with a junction, for example the junction XY, and may also be associated with a particular phase, such as a restricted phase of the junction.

In one case, a user may have a fob (such as one able to transmit a radio frequency signal) or on-board device (OBD) in the vehicle or on their person to communicate to the TSC of the junction, such as by using Dedicated Short Range Communication (DSRC) or SG cellular technology. Such communication may occur with the fob or on-board device transmitting a signal directly to local intersection hardware (e.g. a receiver), such as a Road Side Unit (RSU) located at or near the junction, and configured to communicate with the TSC. Alternatively, the fob or on-board device may transmit through to the cloud to the TMS 101, the TMS 101 then communicating to the TSC of the junction as needed. The fob or OBD may be configured to have a user identifier that may be transmitted as part of a request for bypassing a restriction.

In another case, the user may call a particular phone number and enter a prompt or predetermined code (such as one displayed on a sign) to verify the user's presence at the junction or approach.

In another case, the user may send a text message to a specific number that represents a specific phase of the junction, or to a particular number with a code corresponding to the approach or phase of the junction requested. In another case, the user may send an email or provide a code through an app, the code corresponding to the phase of the junction requested. In each of the above cases, users who are not detected automatically by the TMS 101 at the junction may request to bypass a restriction at the junction, or request information about a status of the junction.

Requests may be communicated through the cloud to the TMS 101 or locally to local intersection hardware. Requests may provide the TMS 101 with a user identifier. A user record may have a user ID, time stamps and past occurrences of use and/or remaining balances of permissions for future uses by different intersections. Further, the user record may include information related or required for deciding whether to grant bypass requests described.

Further, pedestrian pushbutton actuation at the restricted junction may operate independently of a vehicle restricted phase, such that a pedestrian walk signal for a crosswalk in the corresponding direction of the restricted vehicle phase may be provided while a corresponding vehicle phase remains restricted. This prevents a driver from using pedestrian pushbuttons to obtain a green light signal in a restricted phase. In such a case one or more pedestrian crosswalk phases may be provided with a "Walk" signal while the restricted vehicle traffic phases may still remain red.

For example, if the junction XY is operating in a restricted mode with Ph1' and Ph6' in red, actuation of a pedestrian pushbutton for pedestrian phase Ped2' or Ped6' may provide a walk signal for the crosswalks X20 and X10, respectively. However, the vehicle phases Ph1' and Ph6' may still remain red during the restriction time duration RT.

In the sub-process SP104 the process P100 may determine if there is presently a restriction in place or on record for the junction or gate, as described below. If so then the process P100 may proceed to the sub-process SP106. If not then the process P100 may proceed to the sub-process SP102.

A restriction may be by certain DOW and/or TOD that one or more phases of a junction is restricted or a gate is closed. Further restrictions may include one or more of the cases described below for which restrictions are in place.

For a bypass request initiated by a user who may not have been detected automatically, such as by fob, OBD, phone, text message, app or email, the sub-process SPI 04 may determine if the prompt or code received corresponds to a phase of a junction, such as by comparing the code received with a reference table or database, and if the junction or phase has a present restriction.

In the sub-process SPI 06 the process P100 may identify the traffic detected by the sub-process SP100, as described below. If the traffic may be identified then the process P100 may proceed to the sub-process SP108 or the sub-process SP110. If not then the process P100 may proceed to the sub-process SP102, or in certain cases may proceed to the sub-process SP108.

During periods of restriction of one or more phases of a junction or gate, certain authorized vehicles and users may have a level of permission with respect to the junction and may enter or exit the restricted phases. In cases the traffic may be identified, such as if a specific user may be identified, the identity of the user may be compared with one or more databases of one or more sets of users having permissions related to the restricted location. Permission to enter or exit the restricted area, road segment, gate or traffic phase may be categorized as always, never, and conditionally.

A record of permissions may be maintained by or provided to the TMS 101, a control system for a particular junction or border such as an entrance to a gated area, or via an external source of data.

In each case, information needed by the TMS 101 to determine if detected traffic (e.g. a vehicle, bicyclist, pedestrian or any user) may proceed through a restricted location may include a location of the restriction, a requested direction, and whether there is a user identifier of some type available for one or more of the detected traffic.

In one case, a user may have one of at least three levels of permission in the TMS 101 to bypass a restriction, for example, on the road segment Y, including permissions of always, conditionally, and none. A user may have full permission pre-set to always have access to the road segment Y while access to the road segment Y is restricted (barring any permanent or temporary change such as, for example, relocation of the user's residence to an area not on or within the road segment Y, or due to construction or an emergency situation that requires closure of the road segment Y to all traffic). This level of permission may remain active until the user's status with respect to the junction changes, such as if the user moves away from the area or is no longer employed in the area of the restricted junction, and a permission database connected to the TMS 101 is correspondingly updated.

If the process P100 determines the user always has permission, such as a case where the user is known to reside within the restricted road segment or area, then the process P100 may proceed to the sub-process SP110.

A user may not have any permission (e.g. none) to access the road segment Y during the time duration RT that access to the road segment Y is restricted because the user is unknown to the TMS 101, or known by the TMS 101 to not be included among the users that always or conditionally have permission to access the road segment Y. The user may by default not be granted permission to access the road segment Y during a restricted period.

A user may have conditional permission to access the road segment Y while access to the road segment Y is restricted because there may be a record of pre-set permission for the user within the TMS 101, the user belonging to a category of users that may be conditionally granted access to the road segment Y during a restricted period. Conditions may include that the user is an expected guest or visitor of a location on or accessed via the road segment Y (such as the road segments YA, YB, or YC), an authorized service or delivery vehicle, or an official vehicle that is authorized to use the road segment Y.

If the process P100 cannot determine if there is a user among the detected traffic, or the process P100 determines there is a user among the detected traffic who does not have permission, such as the user is specifically restricted from the restricted area, then the process P100 may proceed to the sub-process SP102. One difference between an identified user who never has permission to enter the restricted area and an unknown anonymous user is that in instances the identified user who does not have permission passes through or by a particular restricted location or junction, the identified user may be provided with specific messages or guidance by the TMS 101, or the information may be recorded for later analysis and use. In contrast, information about actions of an anonymous user may be less substantive and any response by the TMS 101 may be commensurately more limited.

If the process P100 determines the user conditionally has permission, such as the user has a record within a database of users with conditional permissions, then the process P100 may proceed to the sub-process SP108.

For a bypass request initiated by the user who may not have been detected automatically, and for which the sub-process P104 has determined there is a present restriction at the user's requested bypass location, the sub-process SP106 may compare the user's fob identifier, phone number, email address, user ID or another identifier from which the user's bypass request was received, with a database of user records and determine the user's level of permission with respect to the junction or location, in a manner similar to the process described above for traffic that may be automatically detected. That is the identifier may be compared with a record of permissions maintained or connected to the TMS 101 and accessible by the process P100.

Further, if the user's identifier does not match an existing record, the process P100 may create and store a record having the user's identifier in a database of user permissions for future reference. The record may include elements such as a time stamp, a number of bypass requests made, and/or a location where a request was made.

In one case, the user identifier does not match an existing record and the sub-process SP106 may proceed to the sub-process SP108.

In another case, the user identifier matches an existing record, such as a record of identifiers who specifically do not have bypass permission, and the sub-process SP106 may proceed to the sub-process SP102. Prior to proceeding to the sub-process SP102 the TMS 101 may respond to the user, such as via a DMS that may be located at or near the junction or location, or through a mobile device of the user or in proximity to the user, such as via an app, text message, email, or phone call, indicating the bypass request was not granted and/or a time duration WT the user may be expected to wait.

In another case, the user identifier matches an existing record, such as the user identifier is related to a record of a known user, who may always have bypass permission for the location but was not automatically detected by the TMS 101. Rather than the process P100 automatically proceeding to sub-process SP110, the sub-process SP106 may proceed to the sub-process SP108 instead in order to verify. Since the user was not automatically detected the sub-process SP108 may be needed to authenticate the user's identity and credentials.

In the sub-process SP108 the process P100 may determine if conditional permission requirements for the user are met to bypass the restriction. If so then the process P100 may proceed to the sub-process SP110. If not then the process P100 may proceed to the sub-process SP102.

Conditional permission for the user to enter or exit the restricted area may vary based on a variety of factors. Such factors may include one or more of frequency, date or day, time period, of past bypass requests by the user or by all users specific to that junction, approach or system-wide, vehicle or vehicle identifier, user status (e.g. residency, employment, guest, etc.), vehicle type, vehicle class, vehicle condition, vehicle or device status, driver or vehicle score stack (VSS) or vehicle group score stack (GSS) if more than one vehicle seeks to bypass the restriction, registration or payment status, and/or only if an additional condition is met or unmet. Permission may be determined by comparison of the user identifier or other traffic characteristic (e.g. vehicle type) with one or more databases of permissions.

In one case, the user may be provided permission to bypass the restriction if the user is associated with a particular organization, for example, the user is associated with an ambulance service, a police department, a fire department, a school bus fleet, a parcel delivery service, or a service provider.

In another case, the user may be provided permission to bypass the restriction if the user has not accessed the restricted location more than a preset number of times within a particular time period, for example, within a present day, within a previous seven day period, within a previous month, or within a previous year.

In another case, the user may be provided permission to bypass the restriction if the user is a known, expected visitor to a location within the restricted area. For example, the user's mobile device ID, telephone number, or other identifier matches a record contained within a database of guests provided by an authorized or registered user.

In another case, the user may be provided permission to bypass the restriction on a present day or during a present time period.

In another case, the user may be provided or denied permission to bypass the restriction if the user is determined to be within a certain vehicle class, such as a motorcycle, a passenger or light-duty vehicle, bus, or a heavy truck.

In another case, the user may be provided permission to bypass the restriction if there has been less than a threshold number of bypass requests requested by all users or provided for the junction or the requested phase of the junction within a time period, such as less than three times during the previous hour.

In another case, the identified vehicle or vehicle identifier is provided permission to bypass the restriction, or the vehicle type is provided permission to bypass the restriction.

In another case, the user may be provided permission to bypass the restriction if the vehicle registration status is current and the vehicle is registered within a particular jurisdiction (e.g. city, county, state, etc.).

In another case, the user may be provided permission to bypass the restriction if the vehicle registration status is current and the vehicle is registered within a particular jurisdiction (e.g. city, county, state, etc.).

In another case, the user may be provided permission to bypass the restriction if a mobile device status of the user indicates the user is not actively using the mobile device, has not done so for at least a minimum time duration, and/or is not otherwise distracted. Distraction may be determined via an app within the mobile device, such as by using a camera to monitor the user's eye or head movement, or using gyroscopic sensors embedded in the mobile device to determine distraction through patterns of device movement.

In another case, the user may be provided permission to bypass the restriction if a camera or sensor on board the user's vehicle detects the user, such as by tracking eye or head movement, is driving and the user does not appear to be drowsy or impaired.

In another case, the user may be provided permission to bypass the restriction if a vehicle the user is driving or traveling within has more than one passenger aboard.

In another case, the user may be provided permission to bypass the restriction upon completion of a transaction (e.g. payment of a fee), provided there is a payment account associated with the user identifier, the account is configured to transact with the TMS 101, and there is a sufficient balance within the account to complete the transaction.

Other examples include restrictions such that a driver's or a vehicle's score stack (VSS) may be such that only those with a present or past score above a particular amount may be granted access to the restricted location.

In yet another case, the user may or may not be provided permission to bypass the restriction if the vehicle registration status is presently sought being sought by another party, such as by Jaw enforcement or a towing service. In such case the restriction, such as a red traffic light signal duration, may be increased to intentionally delay movement of the user, and may also involve informing an appropriate point of contact (e.g. police, dispatch, etc.) about the user or vehicle location. If the user's intended or present route is known or may be estimated, then that information may also be provided to the points of contact.

In yet other cases, the TMS 101 may not have a record or identifier for or related to traffic or a user not automatically identified by the TMS 101, such as a user that initiates a bypass request through a phone or mobile device.

The TMS 101 may require additional authentication to confirm the user is at or near the restriction location for which the bypass is requested. The sub-process SP108 may generate a code C1 and the TMS 101 may display the code C1 on a DMS, either before (pre-generated and displayed) or after a request is made by the user, to confirm the request as valid before deciding whether to initiate a bypass. The DMS may display the code C1 and rely on the user to confirm validity of the request. The user may communicate with the TMS 101 through the user's phone or mobile device, such as by entering or replying to a prompt with the displayed code C1. Upon the user entering and transmitting the code C1 back to the TMS 101, such as by a phone, text, app, camera (such as in a case the code is visually oriented such as a bar or QR code), or email function of the user's mobile device, the TMS 101 may confirm the user's location and grant or deny the bypass request. If the bypass request is granted then the TMS 101 may send a call to the corresponding TSC for the restricted phase restricted phase or direction.

In another case, upon receiving the user's bypass request for a particular location the TMS 101 may prompt a request for a present location of a mobile device identifier and may request a location of the mobile device (e.g. lat/long) to which the user manually or the mobile device may automatically respond with the mobile device identifier, which may include information such as a telephone number, email address, user code, MAC address, AAID (Google Advertising ID), or IDFA (Identifier For Advertising), and a present location of the mobile device.

In another case, the user may enter a predetermined code C2 provided to the user by another party or displayed on the DMS at or near the location of the restriction. The sub-process SP108 may determine if the user's bypass request may be granted if, for example, the predetermined code C2 entered by the user matches a corresponding code within a reference table or database associated with the restricted location or approach. Further, the sub-process SP108 may also confirm that the user's mobile device identifier matches a record in a permissions database that corresponds to a phase of the restricted location. If the junction for which a bypass is requested has a restriction then a condition may be met for the TMS 101 to provide the bypass request.

In another case, an instruction may be sent by the TMS 101 to the user's mobile device. If the user responds in a way instructed to confirm the user's identity or the identity of the user's mobile device, a condition may be met for the TMS 101 to provide the bypass request.

Prior to proceeding to the sub-process SP110 the TMS 101 may provide a response to the user, via ways described above and indicating the bypass request was granted and/or a time duration WT the user may be expected to wait.

The time duration WT may vary within a range of time. The time duration WT may be random or dependent upon whether the user was previously identified, and/or if the user may be identified as having bypass permission in a case traffic is detected automatically at the location of the restriction (e.g. the user's bypass request matches the user's mobile device identifier with an existing permission record). For example, if the user is known to always have permission then the time duration WT may be shorter than if the user is known to presently have conditional permission, for which the time duration WT may in turn be shorter than if the user never has bypass permission relative to the location of restriction. In other words, time the user may have to wait at a restricted location after the sub-process SP108 is complete may depend on the user's level of permission with respect to the location.

If the user identifier does match an existing record and the record indicates the user always has bypass permission at the present location, the user presently has bypass permission there, or the code C2 entered is presently valid at the location then the process P100 may proceed to the sub-process SP110. If the user identifier does not match an existing record then process P100 may proceed to the sub-process SP102.

In addition to forms of traffic detection described above or otherwise known in the art, a user with bypass permission, whether full or conditional, may convey the user's presence and intent to enter the restricted area to the TMS 101 in a multitude of ways.

In the sub-process SP110 the process P100 may open the gate or suspend the restriction for a period of time, a number of traffic signal cycles or phases, or until the user to which the process P100 is responsive to passes through the restricted location. A time from confirmation of bypass to actual opening of the gate or change of the traffic signal in response to the bypass request may vary within a range to discourage users from proceeding before an appropriate response is provided for the corresponding direction of travel. In other words, the time between the end of sub-process SP106 or the sub-process SP108 and the process P100 or the sub-process SP110 opening the gate or changing the traffic signal in response to the bypass request may vary by the time duration WT.

Traffic signals of restricted directions or phases may be red (or displaying "Don't Walk", etc.). Once an authorized user with bypass permission is in an approach to the restricted direction of a junction, for example the junction XY, or otherwise known to be approaching the restricted direction, the TMS 101 may at an appropriate time to match the user's approach, send a request to the TSC of the junction XY to provide a signal to allow the authorized user to pass through a corresponding phase that is otherwise presently restricted. The range of the time duration WT may vary based on a method of request and/or whether a user identifier is received by the TMS 101. In a case a user identifier is received by the TMS 101 the time duration WT may be set to be shorter than in a case a user identifier is not received.

Further, a bypass duration BT of a restricted signal phase for which the sub-process SP110 provides a bypass may range from a minimum green time to a maximum green time for the junction. If a bypass request is received by the TMS 101 from only one user for a cycle then the sub-process SP110 may set the bypass duration BT to be approximately the minimum green time or the TMS 101 may hold the signal phase green until the user is estimated or known to have passed through the junction or gate, such as after being provided with one or more green cycles of the restricted signal phase or by being detected in another location, such as a geofence (e.g. the location ZYn) after a green traffic signal has been provided in the restricted signal phase. If bypass requests are received from more than one user representing more than one vehicle for the same restricted phase of the cycle, the sub-process SP110 may set the bypass duration BT to be greater than approximately the minimum green time or the TMS 101 may hold the signal phase green until more than one user is estimated or known to have passed through the junction or gate.

In one case, the user may enter the virtual approach ZYc (shown in FIG. 1) during a time duration RT that access to the westbound portion of the road segment Y from the junction ZY is restricted. Once the user is determined by the sub-process SP106 or the sub-process SP108 to have bypass permission, the traffic restriction may be temporary lifted.

The TMS 101 may adjust the timing plan for the junction ZY to include a green signal for phase Ph3 during a next or upcoming cycle to allow the user to turn left from the northbound direction of the road segment Z onto the westbound direction of the road segment Y. The timing plan for the junction ZY may change back to a restricted timing plan after the user is provided with at least one green phase Ph3.

Once the TMS 101 has received a subsequent detection of the user's location to confirm the user has passed the restricted location, such as entering a geofence ZYn (shown in FIG. 1) on the road segment Y from the junction ZY, the TMS 101 may adjust the traffic signals ZY1 to change again to operation of a restricted timing plan for the junction ZY, provided the time duration RT is still in effect.

In another case, if the junction XY has a traffic restriction, the traffic signals XY1 and/or ZY1 may change to a timing plan that includes a green light or walk phase corresponding to a direction from which the user is waiting or approaching.

Further, the TMS 101 may hold vehicles or persons of interest, such as those sought by law enforcement, those that are running red lights, those that are known to have very low VSS, or are otherwise disobeying traffic rules by extending a duration of a signal phase, such as a red light or don't walk signal, in a direction of travel of the vehicle or person of interest, or extending a green light or walk signal in a direction that conflicts with the direction of travel of the vehicle or person of interest.

A junction that may be able to restrict traffic in one or more directions, such as either of the junctions XY and ZY, and which may be equipped to identify vehicles, drivers or persons of interest, may hold or delay vehicles or persons sought by police or other parties by extending a duration of a traffic signal, such as a red light or don't walk signal at the junction, and may also do so at a second junction for the purpose of delaying a particular vehicle or person, should the vehicle or party of interest leave the first junction. Vehicles or people may be identified by ALPR, by machine vision that matches, for example, vehicle make, model and color, or through facial recognition, through voice recognition, or by other biometric-related features that may be detected by sensors located at or near the junctions.

The process P100 and any of the sub-processes SP100 to SP110 may create a record and adjust or record events detected, requests received, and actions taken related to traffic, users or vehicles approaching, located at or passing through a junction or restricted area for future reference. The record may include identifying information related to a vehicle or person, and locations traversed.

Figure 5:
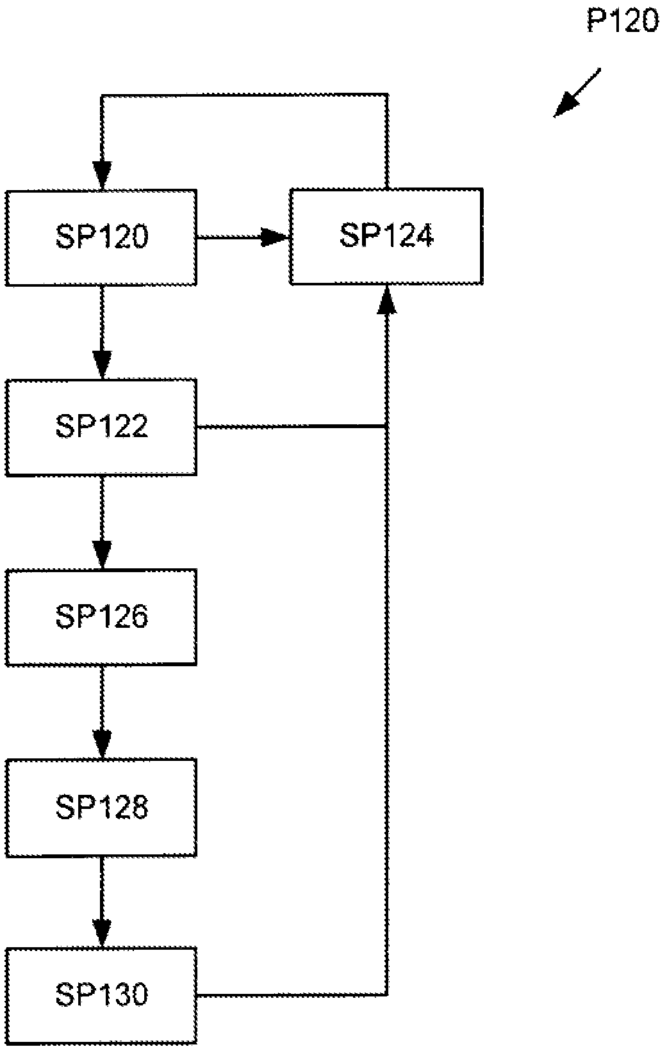
FIG. 5 is a diagram of a pedestrian process P 120, according to one example.

FIG. 5 is a diagram of a pedestrian process P120, according to one example. The process P120 may be used by the TMS 101 at a location having one or more crosswalks, such as those described above for the exemplary junctions XY and ZY, to determine if an alternate pedestrian signal phase may be implemented. The process P120 may include one or more sequences of some or all of sub-processes SP120, SP122, SP124, SP126, SP128, and SP130 described below.

The process P120 may begin by proceeding to the sub-process SP120 to determine if pedestrian traffic is detected, including possible users. If no pedestrian is detected then the process P120 may proceed to the sub-process SP124 resulting in no further action, the signal phase and timing of the junction operating unchanged. Since action may not be needed, the sub-process SP124 may not be necessary but is included for illustrative purposes. If a pedestrian is detected the process P120 may proceed to the sub-process SP122.

In the sub-process SP122 the process P120 may determine if the pedestrian is a known user that requires aμ alternate signal timing plan for the junction, as described below. If so then the process P120 may proceed to the sub-process SP126. If not then the process P120 may proceed to the sub-process SP124.

The pedestrian may be detected in any number of ways described above such as by monitoring devices, sensors or via data input received by the TMS 101 or the local intersection hardware. These may include the user being identified by a camera, an RFID tag, short range or near field communication, a mobile device located inside a geofence and transmitting its location to the TMS 101 or the local intersection hardware (references to the TMS 101 may include local intersection hardware), or facial or motion recognition of a person at a particular location. If the pedestrian is identified as a known user U5 of the TMS 101, such as there is a database record associated with the user U5, then the user U5 may be provided with an alternate signal timing plan with respect to a location of the user U5.

In the sub-process SP 126 the process P 120 may select and change a signal timing plan PS1 presently in use to an alternate signal timing plan AS 1 for the junction, as described below. Then the process P120 may proceed to the sub-process SP128.

The alternate timing plan AS1 selected by the sub-process SP126 may be one associated with a record of the user U5. The user U5, such as a person using a wheelchair or a person who is visually impaired, may have specific needs. The alternate signal timing plan AS1 may be preset to be associated with a record for the user U5 in a database of or connected to the TMS 101.

In one case, the user U5 may use a wheelchair and require additional time to cross a road. The alternate signal timing plan AS1 may account for that need. For example, if the user U5 is detected to be in the geofence XYa of the junction XY (FIG. 2) and known or estimated to intend to cross the road segment X to reach the geofence XYb, then the sub-process SP126 may select the alternate signal timing plan AS1 associated with the user U5. Use of the timing plan AS1 by the TMS 101 may provide a walk signal (for phase Ped6') at the crosswalk X10 for the user US. The pedestrian phase Ped6' of the timing plan AS1 may have a duration greater than that of a duration of the phase Ped6' walk signal for the crosswalk X10 during the signal timing plan PS1. Alternatively, once the user U5 enters the geofence XYa the timing plan AS1 may provide the user U5 with a walk signal at the crosswalk X10 until the user U5 is detected to have entered the geofence XYb, confirming the user U5 has crossed the road segment X, or a maximum time of the walk signal for crosswalk X10 is reached.

In another case, the user U5 may be visually impaired and may have challenges navigating a crosswalk. The alternate signal timing plan AS1 may account for that need. For example, if the user US is detected to be in the geofence XYa of the junction XY and known or estimated to intend to cross the road segment X to reach the geofence XYb, then the sub-process SP 126 may select the alternate signal timing plan AS 1 associated with the user US. Use of the timing plan AS1 by the TMS 101 may provide that some or all vehicle traffic phases of the traffic signals XY1 at the junction XY (e.g. Ph1', Ph4', Ph6', Ph7' and Ph8') change to red, and may include a case where all phases for vehicles and/or bicycles are red. Once the traffic signals XY1 are red the user US may be provided with one or more walk signals, such as for the crosswalks X20, X10, and Y20 (e.g. pedestrian phases Ph2', Ph6', Ph8', respectively) for a duration of one crosswalk time duration or a sum of two or more crosswalk time durations (e.g. those of X10 and Y20), up to a maximum crosswalk time duration that may be preset for the junction or for the user U5. In effect, the timing plan AS1 may result in some or all of the traffic signals XY1 turning red for vehicle and/or bicycle phases in all directions, and providing walk signals in some or all crosswalk directions of the junction XY for up to a predetermined maximum time period, or until the user US is detected to have entered a geofence, such as the geofence XYb or the geofence XYc, across a road segment, confirming the user US has reached the other side of the road.

Alternatively, the timing plan AS1 may provide the user US with the walk signal (Ped6') at the crosswalk X10 until the user U5 is detected to have entered the geofence XYb, confirming the user U5 reached the other side of the road, or a maximum crosswalk walk time for crosswalk X10 is reached.

Further, if there are OMS (such as may be the case with signs SN1'-SN4') or dynamic speed limit signs in the vicinity of the junction, messages (such as warning messages or lower speed limits) may be displayed during periods of time the user U5 is known to be near or crossing the junction XY. For example, if the user U5 is known to need or has requested crossing the road segment Y via the crosswalk Y40 at the junction ZY, and the user U5 is known to be visually impaired, the TMS 101 may provide a red light signal in all vehicle phases at the junction ZY and provide the user U5 with a walk signal in the pedestrian phase Ped8 for the crosswalk Y40. Alternatively, the TMS 101 may provide the user U5 with the same pedestrian phase Ped8. However, instead of stopping all vehicle phases, the TMS 101 may be responsive to the user U5 by stopping traffic in phases Ph1, Ph2, Ph6, and Ph7 while allowing traffic in Phases Ph3, Ph4, and Ph8 to continue. Further, the TMS 101 may also prevent traffic in phase Ph8 from turning right by displaying a "No Turn On Red" message on the sign SN1.

Further, if the process P120 is operating for a mid-block crossing with flashing warning lights but without other traffic signals, the flashing warning lights may begin flashing after the user U5 is detected in the sub-process SP122, such as by entering a first geofence on one side of a road segment, and the process P120 begins sub-process SP126. The flashing warning lights may continue flashing until the user U5 is identified to have crossed the road segment, such as entering a second geofence on a second side of the road segment, or a time duration has elapsed since the user U5 was first detected. The flashing time duration may be preset in a record of the user U5 within or connected to the TMS 101.

Further, a DMS located at or near a crosswalk or crossing during use by the user U5 may display messages for vehicles and drivers to indicate a warning related to the user U5, such as "Caution: Disabled Pedestrian" or "Pedestrian Present".

In the sub-process SP128 the process P120 may provide feedback to the user U5, such as about the status of a traffic signal. Feedback provided to the user U5 may be provided in visual, audio or haptic format through infrastructure, such as at the junction XY, or through a mobile device associated with the user U5, such as a mobile phone, tablet computer, or a wearable device (e.g. a smart watch, fitness bracelet or ring), as described below. Then the process P120 may proceed to the sub-process SP130.

In one case, infrastructure at the roadside such as a pedestrian pushbutton assembly may provide haptic or audible feedback to indicate to the user U5 a walk signal is being provided. Haptic feedback may in the form of a duration and/or number of repetitions of a vibration pattern to indicate to the user U5 a walk signal is being provided, and may also include a name or direction of the walk signal. Visual feedback may be provided to the user U5 by a pedestrian signal head mounted at the junction XY, and audible feedback may be provided with messages such as "Walk", "Wait" or "Don't Walk".

In another case, a mobile device of the user U5 may provide haptic, audible or visual feedback to indicate to the user U5 a walk signal is being provided. Haptic feedback may in the form of a duration and/or number of repetitions of a vibration pattern to indicate to the user U5 a walk signal is being provided, and may also include a name or direction of the walk signal. Visual feedback may be provided to the user U5 through a display screen or indicator of the mobile device of the user U5.

In the sub-process SP130 the process P120 may end the alternate signal timing plan and revert to another signal timing plan AS1 for the junction, such as the timing plan PS1 that was in effect before the alternate timing plan. Then the process P120 may proceed to the sub-process SP124.

Figure 6:
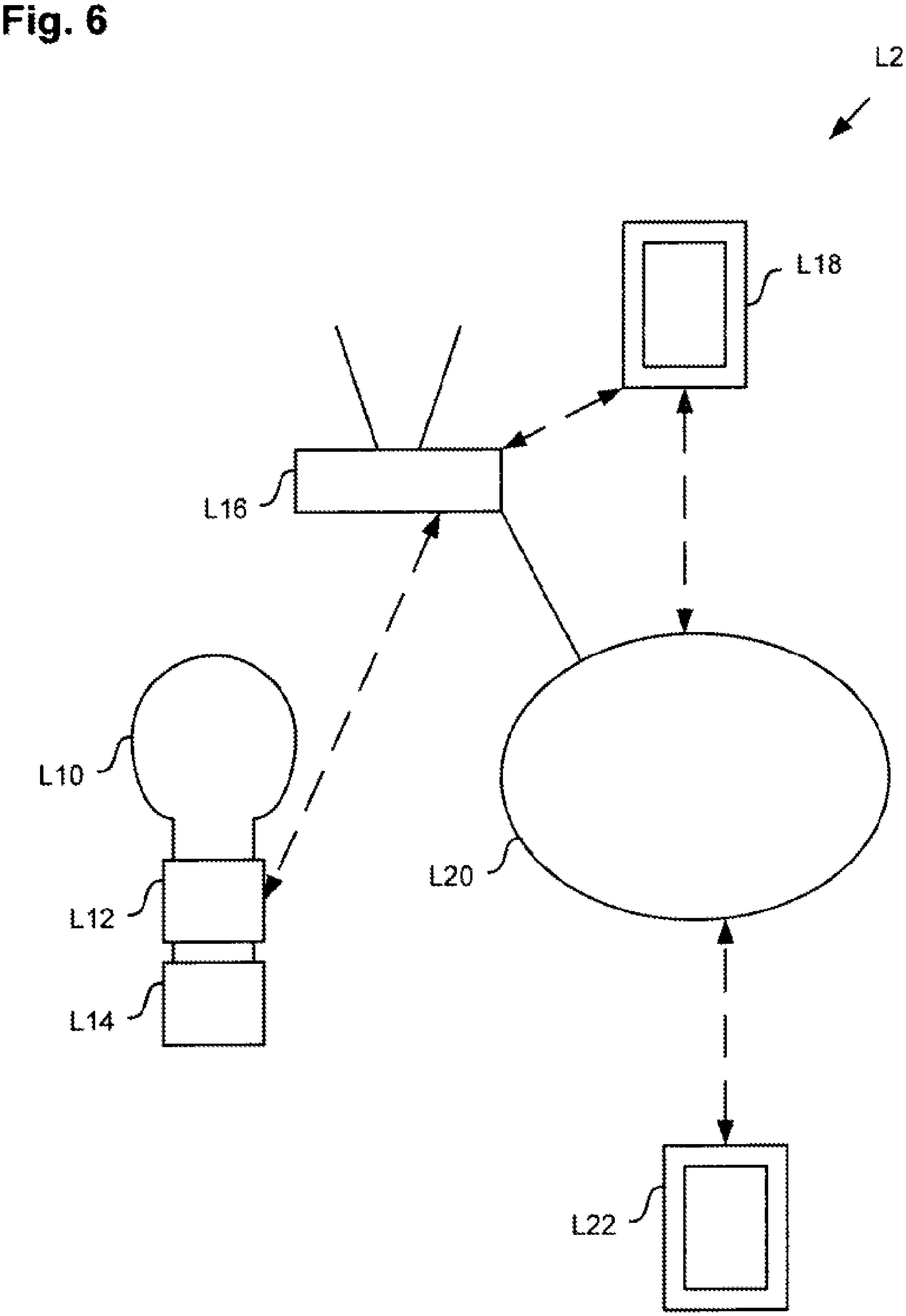
FIG. 6 is a diagram of an Internet of Things (IoT) system L2, according to one example.

FIG. 6 is a diagram of an Internet of Things (IoT) system L2, according to one example. The system L2 may have a router L16, a first and a second mobile device, such as smart phones L18 and L22, respectively, and a computing network, such as an internet L20, and an IoT device, for example a smart socket L12, and a light bulb L10, a light bulb socket L14. Other IoT devices may include a gate, a smart or automated door lock, a garage door opener, a building alarm, a robot, a microphone or audio device, or a video camera configured to communicate with the router L16 or the internet L20, and to respond in predetermined ways to a mobile device. Responses may be dependent upon a location of the first and/or the second mobile device with respect to a geofence.

The router L16 may be connected to and configured to communicate with the internet L20. The first mobile device L18 and the second mobile device L22 may also be configured to communicate with the internet L20, either directly such as via cellular communication, or through the router L16 such as via wifi. In another example, the router L 16 may be a base station also using cellular communication to communicate with the internet L20.

The light bulb socket L14 may be connected to the smart socket L12, and configured to provide electrical power to the smart socket L12. The light bulb L10 may be connected to the smart socket L12, receiving electrical power from the light bulb socket L14 by way of the smart socket L12 and controlled by the smart socket L12.

Figure 7:
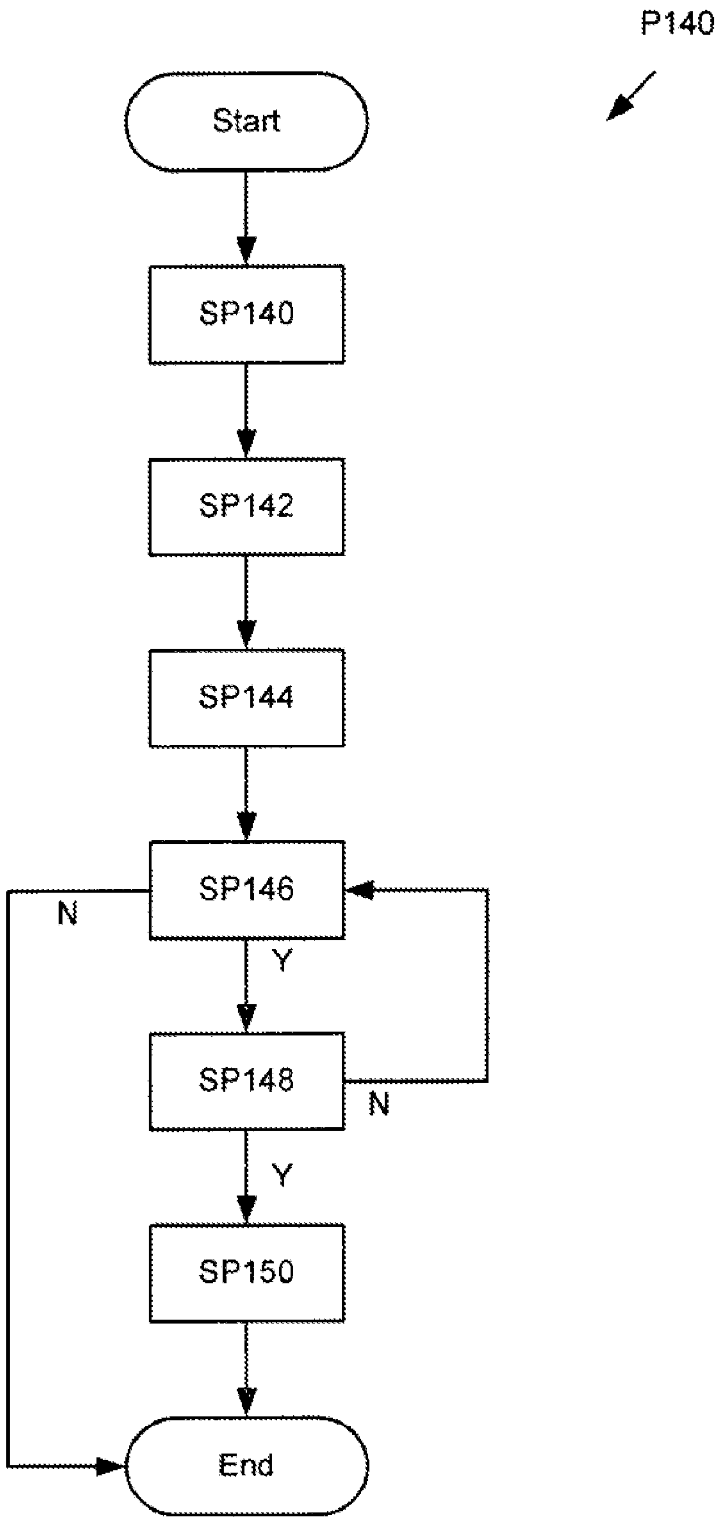
FIG. 7 is a diagram of a process P140, according to one example.

The smart socket L12 may be configured to communicate with the router L16 to send and receive information, and the smart socket L12 may be configured to provide power and input to the light bulb L10 in a variety of patterns or intervals, such as by a process described by FIG. 7.

The light bulb L10 may be capable of displaying a variety of colors in accordance with commands received from the smart socket L12 during periods of time that electrical power is supplied to the light bulb L10 by the smart socket L12. The light bulb L10 may be formed by one or more light emitting diodes (LEDs) capable of illuminating in a variety of colors across a time domain.

The first mobile device L18 may not necessarily be a mobile device, as it may also be a desktop or laptop computer connected via wifi or cable connection to an IoT device, such as the smart socket L12, through the internet L20 or the router L16.

FIG. 7 is a diagram of an IoT control process P140, according to one example. The process P140 may be used by the first mobile device L18 and/or the second mobile device L22, the IoT system L2 or the TMS 101 to determine if an IoT device, such as a smart socket L12, may be actuated.

The process P140 may include one or more sequences of some or all of sub-processes SP140, SP142, SP144, SP146, SP148, and SP150 described below.

The process P140 may begin by proceeding to the sub-process SP140 for the smart socket L12 to be configured.

A configuration of the smart socket L12 may be set by a user, for example, of the first mobile device LI 8. The configuration may include a geofence G1 around a location related to the smart socket L12, one or more colors for the light bulb L10 to display when actuated by the smart socket L12, a frequency of actuation during operation by the smart socket L12, a time duration F for which the smart socket L12 is to be responsive to a location of the first mobile device L18 or the second mobile device L22, or responsive to communication from the internet L20, and/or a future time FT for actuation of the smart socket L12 to begin. The configuration may also include information such as a name, a street address, a telephone number, an email address, an access code (e.g. for a location within a gated community) or other location data associated with the smart socket L12 and the geofence G1. The process P140 may then proceed to the sub-process SP142.

In the sub-process SP142 the process P140 may provide information about components of the IoT system L2, such as the smart socket L12, to the internet L20 or the second mobile device L22. The smart socket L12 or the first mobile device L18 may send a packet LP1 having a set of data including all or part of the smart socket L12 configuration from the sub-process SP140, to a database LP5 connected to the internet L20 for storage, and/or to the second mobile device L22. Once the sub-process SP142 is completed, the process P140 may proceed to the sub-process SP144.

In the sub-process SP144 of the process P140, the second mobile device L22 may receive a packet LP2 having some or all of the data contained within the packet LP1 or a link for a user to access such data, such as via a text message or through a web app, from the first mobile device L18, the smart socket L12, or from the database LP5 via the internet L20.

The second mobile device L22 may receive the packet LP2 approximately immediately after the first mobile device L18 sends the packet LP1 or the second mobile device L22 may receive the packet LP2 at a later time upon an event, such as at a scheduled time or during a dispatch event. This may occur if the smart socket L12 or the IoT system L2 has a configuration (e.g. packet LP1 or LP2) registered with another database in advance in case of an emergency situation, such as that connected to or operated by a system of a first responder agency that may be connected to the internet L20 and ultimately the smart socket L12.

In one case, the second mobile device L22 may receive the packet LP2 without delay. In another case, the second mobile device L22 may receive the packet LP2 at a later time, such as at a scheduled time. If the first mobile device L18 sent the packet LP2 to the second mobile device L22 and the packet LP2 includes a future time FT then the process P140 may proceed to sub-process SP146. However, if the first mobile device L18 sent the packet LP2 to the database LP5 through the internet L20 or a service such as a web app connected to the internet L20 but not the second mobile device L22, then the internet L20 or the web app may not send the packet LP2 to the second mobile device L22 until the scheduled future time FT, whereupon the second mobile device L22 may begin to operate as described in the sub-process SP146.

In another case, the second mobile device L22 may receive the packet LP2 at a later time, such as upon an event. The first mobile device L18 may have sent the packet LP2 to the database LP5 and not the second mobile device L22. The internet L20 or a service such as a web app W8 connected to the internet L20 may not send the packet LP2 to the second mobile device L22 unless a condition is met. For example, the packet LP2 may only be sent to the second mobile device L22 in a case that a dispatch system assigns a vehicle with the second mobile device L22 aboard to travel to a location associated with the packet LP1. Further, the vehicle itself may be the second mobile device L22. In another example, the packet LP2 may only be sent to the second mobile device L22 in a case the second mobile device L22 has reached a particular location or milestone, such as it is within a target distance of the geofence Gl. In another example, the packet LP2 may only be sent to the second mobile device L22 in a case the second mobile device L22 is authorized to receive the packet LP2 such as through successful completion of an authentication process between the first mobile device L18 or the web app W8, and the second mobile device L22. Once the sub-process SP144 is completed, the process P140 may proceed to the sub-process SP146.

In the sub-process SP146 the process P140 may compare if the future time FT is applicable and has been reached, and whether the time duration F is current. If the mobile device L22 receives the packet LP2 and the packet LP2 includes the future time FT, then the second mobile device L22 may first compare a present time with the future time FT. If the future time FT is later than the present time then the process P140 may repeat the sub-process SP146 from the beginning or schedule to repeat sub-process SP146 from the beginning when a present time matches the future time FT. If the future time FT is not later than the present time then the sub-process SP146 may continue.

If the second mobile device L22 receives the packet LP2 and the packet LP2 does not include the future time FT (or if the future time FT is not later than the present time), then the second mobile device L22 may begin counting a time duration TD7 and comparing it with the time duration F from the packet LP2. If the time duration TD7 is less than the time duration F, meaning the process P140 is presently in an active operating period, then the process P140 may proceed to the sub-process SP148. If the time duration TD7 is not less than the time duration F then the process P140 may come to an end.

Alternatively, the smart socket L12 may compare the future time FT from the packet LP1 or the packet LP2 with a present time. If the future time FT is not later than the present time then the smart socket L12 may begin to accept communication for the time duration F. During the time duration F the smart socket L12 may accept certain communication from the internet L20 and/or the second mobile device L22. In one case, the smart socket L12 may ignore any communication received outside of the time duration F from any device other than the first mobile device L12. In another case, the smart socket L12 may ignore all comminutions received from any device outside of the time duration F. If the smart socket L12 receives certain communication from the internet L20 and/or the second mobile device L22 during the time duration F then the process P140 may proceed to the sub-process SP148.

In the sub-process SP148 the process P140 may determine if a device, such as the second mobile device L22, has entered the geofence G1. In one case the internet L20 or the web app W8 may determine the second mobile device L22 has entered the geofence G1, and then the process P140 may proceed to the sub-process SP150. In another case the second mobile device L22 may enter the geofence G1 and then communicate its location to the smart socket L12 through the internet L20 and the router L16.

Alternatively, the smart socket L12 may compare data within the first packet LP1 or the second packet LP2 with that of data received from another device, such as the second mobile device L22. If the smart socket L12 determines the data received confirms the second mobile device L22 is presently located within the geofence G1 then the process P140 may proceed to the sub-process SP150. If not then the process P140 may return to the sub-process SP146.

In the sub-process SP150 the smart socket L12 may actuate the light bulb L10 according to the configuration contained within the first packet LP1.

In one case, the smart socket L12 may actuate the light bulb L10 to illuminate and then dim or turn off approximately once every two seconds.

In another case, the smart socket L12 may actuate the light bulb L10 to illuminate and then dim or turn off approximately once every one second.

In another case, the smart socket L12 may actuate the light bulb L10 to illuminate and then dim, turn off or change color, for example, in an alternating pattern of more than one color such as in red and in green, such as during a holiday display.

In another case, the smart socket L12 may actuate the light bulb L10 to illuminate and then dim or turn off at an approximate frequency of more than once per second or higher than that of any of the previous cases described. Further, the light bulb L10 may illuminate, for example, such as in red or alternating between red and blue, signifying an emergency.

Some cases may be related to specific situations. For example, if the smart socket L12 is configured to respond to a first responder agency dispatch (e.g. police or rescue squad), as described above, then actuation may be according to an emergency configuration. If the smart socket L12 is configured to respond to a delivery or commercial event then actuation may be according to a service configuration. If the smart socket L12 is configured to respond to a visiting guest then actuation may be according to a guest configuration with a unique set of colors, patterns, and frequency compared with those of other configurations.

Additionally, the IoT system L2 or the smart socket L12 may also actuate additional signals in the first mobile device L18 and/or the second mobile device L22 once one device, such as the second mobile device L22, enters the geofence G1. Additional signals may include visual, audio or haptic signals to signify the second mobile device L22 has arrived.

Further, other IoT devices may also be actuated, such as by the smart socket L12, the web app W8 or through the internet L20 in general, whether the light bulb L10 is actuated or not. Other IoT devices may include a gate, a smart or automated door lock, a garage door opener, a building alarm, a robot, an audio device (microphone, siren, loudspeaker, etc.), or a video camera configured to communicate with the router L16 or the internet L20, and to respond in predetermined ways to a mobile device. Responses may be dependent upon a location of a first and/or a second mobile device with respect to a geofence.

In one case, the sub-process SP150 may also actuate a gate to open. In another case, the sub-process SP150 may also actuate a smart door lock that may be locked to unlock and allow entry. In another case, the sub-process SP150 may also actuate a garage door opener to open or close. In another case, the sub-process SP150 may also actuate a building or home alarm to sound. In another case, the sub-process SP150 may also actuate an audio device or video camera to broadcast, record, and/or transmit. In another case, the sub-process SP150 may also actuate a sprinkler system to begin operation. In a case an IoT device is connected to the internet L20, such as by the router L16, and the IoT device is equipped to provide an audio or a video signal, the output of the IoT device output may also be transmitted to the first mobile device L18, the second mobile device L22, a third mobile device L24, or the web app W8. Once the sub-process SP150 is completed the process P140 may come to an end.

What is claimed is:

1. A system for selectively restricting traffic through at least one phase of a signalized junction, the system comprising a traffic management system (TMS) having a traffic signal controller (TSC), wherein the TSC is configured to communicate with the TMS and respond to inputs from the TMS, including commands resulting from a traffic detection data input having information about at least one of a traffic count and a traffic user identifier for the at least one phase that is restricted, the at least one phase of the signalized junction that is restricted remaining in a red signal status until the traffic detection data input received by the TMS is determined to be for at least one of the traffic count, the traffic count resulting in a traffic count per time period below a predetermined threshold, and the traffic user identifier matches with at least one of a database record of authorized users and a database record of valid authorization codes to pass through the at least one phase of the signalized junction that is restricted; and the TMS then sends an input signal to the TSC to provide a green signal status for the at least one phase that is restricted, and the TSC reverts to the red signal status in the at least one phase after at least one of the current signal phase and the current signal cycle while the system is operating in a restrictive mode.

2. The system of claim 1 wherein the traffic detection data input is received by the TMS from a mobile device configured to transmit at least one of the mobile device location and an identifier to the TMS after the mobile device enters a geofence corresponding to the at least one phase that is restricted.

3. The system of claim 2 wherein the traffic detection data input further comprises at least one of a vehicle condition, a vehicle status, a vehicle score stack (VSS), a vehicle group score stack (GSS), a vehicle occupancy status, a user status, and a payment status.

4. The system of claim 1 further comprising at least one of:

a road side unit (RSU) connected to at least one of the TSC and the TMS, and configured to receive the traffic detection data input from a vehicle on-board device (OBD), wherein the TMS sends the input signal through the RSU to the TSC; and a camera connected to the TMS and configured to detect and identify the traffic detection data input from at least one of a vehicle class, a vehicle type, a vehicle occupancy, a face of a vehicle occupant, and a license plate.

5. The system of claim 1 further comprising a receiver connected to at least one of the TSC and the TMS, and configured to receive traffic detection data input from a wireless device, wherein the receiver sends the input signal to at least one of the TMS and the TSC for a green signal status in at least one phase of the signalized junction in a case the wireless device is activated within range of the receiver.

6. The system of claim 1 further comprising a communication process for the TMS to receive the traffic detection data as an authorization code from at least one of a telephone prompt and a text message corresponding to at least one of the signalized junction location, direction, and phase.

7. The system of claim 1 or claim 6 further comprising a dynamic message sign (DMS), wherein the DMS is configured to display an information about the signalized junction, wherein the information includes at least one of a status of the junction, a status of the at least one restricted phase, a message for the public, and a message for the specific user detected.

8. The system of claim 7 wherein the status of the at least one restricted phase is a countdown timer display indicating time until the at least one phase signal will change status.

9. The system of claim 7 wherein the information includes an authorization code for the user to request to the TMS to bypass a restriction and proceed through the at least one phase of the signalized junction.

10. The system of claim 1 further comprising a movable barrier, wherein while the system is operating in the restrictive mode, the TMS is configured to operate and position the movable barrier to prevent vehicular traffic in the at least one phase of the signalized junction that has the red signal status, and the movable barrier is positioned by the TMS to allow vehicular traffic to pass through the at least one phase while the at least one phase has the green signal status.

11. A method for selectively restricting traffic through a signalized junction connected to a traffic management system (TMS) comprising:

operating a traffic signal controller (TSC) to maintain a red signal status in at least one phase of the signalized junction during operation in a restricted mode;

receiving a traffic detection data input having information about at least one of a traffic count and a traffic user for the at least one phase that is restricted;

determining if the traffic detection data input received is authorized; and sending an input signal to the TSC to provide a green signal status in the at least one phase that is for a time period in a case the traffic detection data input received is authorized.

12. The method of claim 11 further comprising:

receiving the traffic detection data input from at least one of:

a mobile device configured to transmit at least one of the mobile device location and an identifier to a traffic management system (TMS) after the mobile device enters a geofence corresponding to the at least one phase that is restricted;

a wireless device configured to transmit a wireless signal to a receiver connected to the TMS;

a camera configured to detect and identify at least one of a vehicle class, a vehicle type, a vehicle occupancy, a face of a vehicle occupant, and a license plate; and a communication process configured to receive the traffic detection data as an authorization code from at least one of a telephone prompt and a text message corresponding to at least one of a signalized junction location, direction, and phase.

13. The method of claim 11 wherein determining if the traffic detection data input received is authorized further comprises determining at least one of:

a traffic count, the traffic count resulting in a traffic count per time period below a predetermined threshold; and a traffic user identifier matches with at least one of a database record of authorized users and a database record of valid authorization codes.

14. The method of claim 11 further comprising:

sending an input signal to the TSC to revert to the red signal status in the at least one phase that is restricted, after at least one of the current signal phase and the current signal cycle while operating in the restricted mode.

15. The method of claim 11 further comprising:

operating a movable device to prevent vehicular traffic to pass through the at least one phase while the at least one phase has a red signal status; and operating a movable device to allow vehicular traffic to pass through the at least one phase while the at least one phase has a green signal status.

* * * * *